March 3, 1964     E. N. MARTIN     3,123,255
DRINK MIXING DEVICE
Filed Oct. 3, 1960
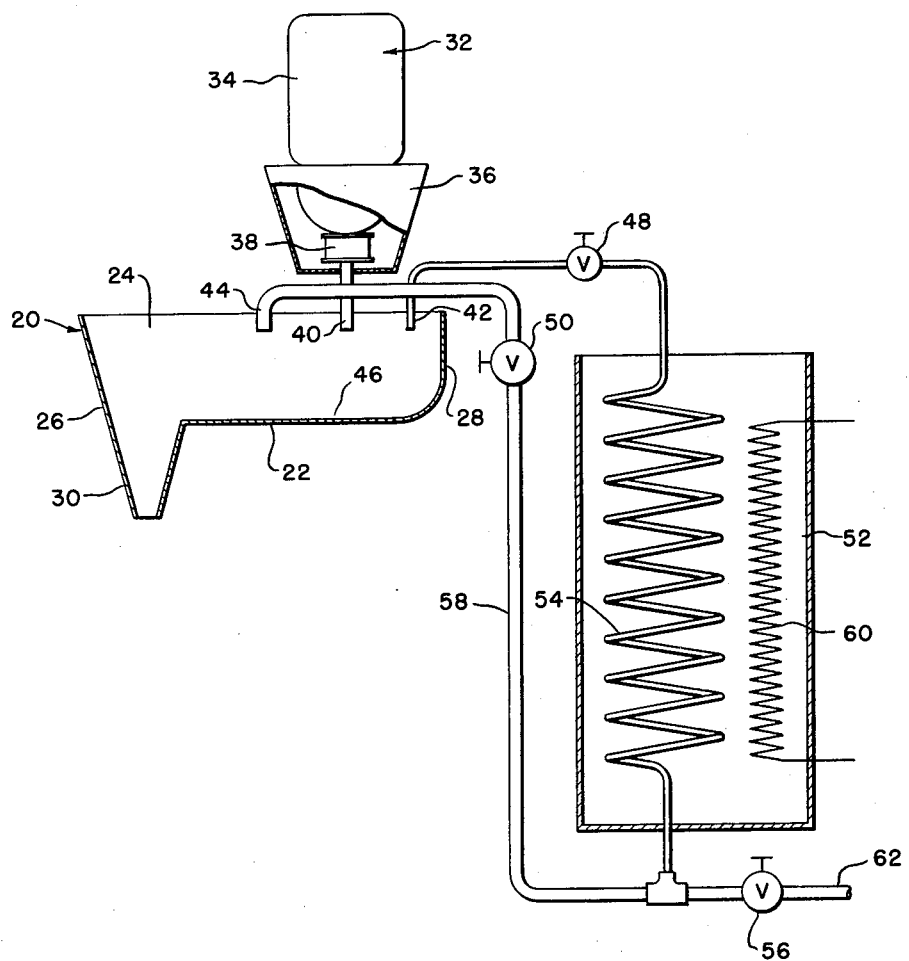
INVENTOR.
ERNEST N. MARTIN
BY *Fulwider, Mattingly
and Huntley*
ATTORNEYS

United States Patent Office 3,123,255
Patented Mar. 3, 1964

3,123,255
DRINK MIXING DEVICE
Ernest N. Martin, 1141 High St., Escondido, Calif.
Filed Oct. 3, 1960, Ser. No. 59,981
2 Claims. (Cl. 222—145)

The present invention relates to a mixing device for a drink and more particularly to a mixing device for mixing a comminuted substance such as a comminuted food or a comminuted ingredient for a drink such as powdered tea or coffee.

The present invention includes a mixing or diluting chamber in which the comminuted substance is first dissolved and thereafter diluted. To accomplish this, there is provided a dispenser for the comminuted substance which discharges the substance into the mixing chamber. Hot liquid is delivered to the discharge substance to define a dissolving area in the mixing chamber. The mixing chamber is provided with a mixture outlet, and cold liquid is delivered to the dissolved substance intermediate the dissolving area and the outlet to dilute the dissolved substance to the desired extent.

The advantages will be apparent from the following description, reference being had to the accompanying drawing wherein a preferred embodiment of the invention is illustrated.

In the drawing:

The figure of the drawing is a schematic view of the invention, the mixing chamber being shown in vertical cross-section.

Referring more in detail to the drawing, the mixing chamber is shown at 20 having a bottom wall 22, upright and opposite side walls, one of which is shown at 24, and end walls 26 and 28. The bottom is provided with an outlet 30 adjacent end wall 26.

A dispenser 32 for the comminuted substance is preferably of the type shown in the co-pending application of S. Morgan Barber, entitled "Material Dispensing Apparatus," Serial No. 815,026, filed May 22, 1959, now abandoned. This dispenser includes the inverted jar or container 34 for the comminuted substance, the receiving chamber 36, the magnetic coil 38 for the magnetic core actuated valve (not shown), and the discharge outlet 40. This discharge outlet is disposed for discharge into the mixing chamber 20 closer to end wall 28 than to end wall 26.

The mixing chamber 20 receives liquid through two tubes 42 and 44. Tube 42 discharges liquid to a section of the mixing chamber closer to end wall 28 than to end wall 26 and is preferably disposed to discharge liquid to between end wall 28 and the outlet 40 of the dispenser. Thus the surrounding area 46 below the outlet 40 defines a dissolving area for the comminuted substance since hot liquid is delivered to the area at the time that the substance is being discharged from the dispenser.

Cold water is delivered to mixing chamber, by tube 44, at a section forming an area lying in the same horizontal plane and contiguous with the dissolving area 46 and intermediate the dissolving area 46 and the outlet 30 of the mixing chamber. The cold water added to the dissolved mixture, as dissolved in area 46, is sufficient for the proper consistency of the drink. Thus the perfected drink is dispensed below the outlet 30 of the mixing chamber.

Some substances, for example, powdered tea, dissolves in cold water within a few seconds, yet this same substance when subjected to ice or ice water, will not dissolve completely, leaving a spotty residue. The general practice in restaurants is to place the ice in a glass tumbler and then hold the tumbler under the mixer outlet. It has been found, however, that if the discharged liquid from the mixture is not completely dissolved when entering the tumbler containing ice, further dissolving is not completed, leaving a spotty residue on the ice and the interior of the glass tumbler, which of course is highly objectionable.

By subjecting the comminuted substance first to hot liquid, dissolving is completed whereby, when the dissolved mixture is subjected to ice or ice water, there is no residue remaining to spot the ice or the wall of the tumbler. Too, inasmuch as cold water is added after the dissolving act, the diluted drink is completed upon entering the tumbler.

The present invention provides for the ready and facile making and dispensing of drink formed of a comminuted substance and a liquid. This liquid may be water, milk or any liquid used in a drink. Of course for iced tea or iced coffee, the liquid would be water. Another example would be powdered chocolate or powdered cocoa and the liquid could be milk. The powdered chocolate or powdered cocoa would be dissolved in the hot milk in the dissolving area 46 and this dissolved mixture would be diluted with cold milk.

It will of course be understood that the temperature of the hot liquid and the relative quantity of the hot liquid with respect to the quantity of cold liquid will vary with variations of conditions, for example one such condition would be the variation in temperature of the source of supply of the liquid. It has been found that excellent results have been attained by heating the cold tap water, as drawn from the street, to approximately 200° F., using approximately twenty percent hot water and eighty percent of said cold water. The relative quantities of water can be regulated by valves 48 and 50, disposed respectively in tubes 42 and 44.

Any desirable type of heat exchanger may be employed for heating the liquid. For illustrative purpose, there is shown in heat sink 52 of metal having embedded therein a stainless steel or copper tube 54 which is connected, at its inlet end, to a valve 56 and at its outlet end to valve 48. This tube 54, in the form of a coil, is relatively small in cross-section, relative to the cold water tube 58 which is also connected with valve 56; the outlet end of tube 58 is connected to valve 50. The relative diameters of the tubes 54 and 58 can be such that, at city water pressure on the pipe 60 leading to valve 56, the resistance of tube 54 is such that only approximately twenty percent of the water flows therethrough while eighty percent flows through tube 58, when both valves 48 and 50 are fully open.

While not limited thereto, the present invention can be employed in a system in which the valve 56 is actuated by a coin actuated timer in which a predetermined quantity of liquid passes through the system by depositing a coin, and, simultaneously a predetermined quantity of comminuted substance passes from the dispenser 32 through the valve controlled by the magnetic coil 38.

Any suitable means may be employed for measuring the quantity of comminuted substance dispensed from dispenser 32 relative to the quantity of liquid passing valve 56.

Any suitable means may be employed for heating the heat sink 52. Preferably a plurality of electric resistors, such as the one shown at 60, are employed.

The pipe 62 leads from a source of liquid supply to valve 56.

While the form of embodiment herein shown and described constitutes a preferred form, it is to be understood that other forms may be adopted falling within the scope of the claims that follow.

I claim:
1. A mixing device for a drink, comprising in combination:
 (A) A mixing chamber having:
  (1) a mixing outlet,
  (2) a section forming a mixing and dissolving area,
  (3) and a section interposed between the first mentioned section and the outlet, forming a diluting area;
 (B) a dispenser for comminuted substance having a discharge outlet disposed for discharging said substance above the first mentioned section;
 (C) means for delivering heated liquid directly to the first mentioned section to mix with and dissolve said substance;
 (D) and means for delivering cold liquid to directly above the second mentioned section for cooling and diluting the substance and liquid which was mixed and dissolved in the first mentioned section.

2. A mixing device for a drink as defined in claim 1, characterized in that the top surfaces of said areas are contiguous and lie in substantially the same horizontal plane.

References Cited in the file of this patent

UNITED STATES PATENTS

| | | |
|---|---|---|
| 2,660,351 | Thompson | Nov. 24, 1953 |
| 2,803,599 | Callahan et al. | Aug. 13, 1957 |
| 2,838,077 | Cooper | June 10, 1958 |
| 2,954,145 | McCauley | Sept. 27, 1960 |
| 2,977,026 | Delgado | Mar. 28, 1961 |
| 3,053,423 | Montara | Sept. 11, 1962 |

FOREIGN PATENTS

| | | |
|---|---|---|
| 615,915 | Canada | Mar. 7, 1961 |